(12) United States Patent
Pampu et al.

(10) Patent No.: US 9,143,918 B2
(45) Date of Patent: *Sep. 22, 2015

(54) METHOD AND DEVICE FOR IMPROVING NETWORK DISCOVERY AND SELECTION

(71) Applicant: Huawei Technologies Co., Ltd., Shenzhen, Guangdong (CN)

(72) Inventors: Cornel Pampu, Bonn (DE); Qing Zhou, Berlin (DE); Yu Yin, Shanghai (CN); Wenfu Wu, Shanghai (CN); Haiyong Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

This patent is subject to a terminal disclaimer.

(21) Appl. No.: 13/899,937

(22) Filed: May 22, 2013

(65) Prior Publication Data

US 2013/0252641 A1    Sep. 26, 2013

Related U.S. Application Data

(63) Continuation of application No. 13/237,314, filed on Sep. 20, 2011, now Pat. No. 8,472,948, which is a continuation of application No. PCT/CN2009/070914, filed on Mar. 20, 2009.

(51) Int. Cl.
*H04W 4/00* (2009.01)
*H04M 11/04* (2006.01)
(Continued)

(52) U.S. Cl.
CPC .............. *H04W 8/08* (2013.01); *H04W 36/385* (2013.01); *H04W 48/18* (2013.01); *H04W 36/0055* (2013.01)

(58) Field of Classification Search
CPC ..... H04W 8/183; H04W 48/18; H04W 60/00; H04W 36/08
USPC ............. 455/422.1, 432.1, 433, 435.1–435.3, 455/404.2
See application file for complete search history.

(56) References Cited

U.S. PATENT DOCUMENTS 8,472,948 B2 *  6/2013  Pampu et al. .............. 455/432.1
2007/0218905 A1  9/2007  Lee
(Continued)

FOREIGN PATENT DOCUMENTS

CN      101039522 A     9/2007
CN      101170824 A     5/2008
(Continued)

OTHER PUBLICATIONS

"Universal Mobile Telecommunications System (UMTS); LTE; Architecture Enhancements for non-3GPP Accesses)," Jan. 2009, ETSI TS 123 402, V8.4.1, ETSI, Sophia Antipolis Cedex, France.
(Continued)

*Primary Examiner* — Dung Hong
(74) *Attorney, Agent, or Firm* — Leydig, Voit & Mayer, Ltd.

(57) ABSTRACT

The present invention provides a method for improving Network Discovery and Selection suitable for a UE which is moving into a new TA, which comprises: receiving, by a MMF, a TAU request including the new TA from the UE; allocating, by the MMF, a new TA List according to the new TA in the TAU request; sending, by the MMF, the new TA List to the UE; sending, by the MMF, a TA information to a Mobility Policy Function, MPF, for updating mobility policy of the UE if the new TA is a special TA covered by different networks.

5 Claims, 12 Drawing Sheets

(51) Int. Cl.
*H04W 8/08* (2009.01)
*H04W 36/38* (2009.01)
*H04W 48/18* (2009.01)
*H04W 36/00* (2009.01)

(56) References Cited

U.S. PATENT DOCUMENTS

| | | | |
|---|---|---|---|
| 2008/0102826 A1 | 5/2008 | Voyer et al. | |
| 2009/0274069 A1 | 11/2009 | Olsson et al. | |
| 2010/0003980 A1 | 1/2010 | Rune et al. | |
| 2011/0261715 A1* | 10/2011 | Norefors et al. | 370/252 |

FOREIGN PATENT DOCUMENTS

| | | |
|---|---|---|
| CN | 101272318 A | 9/2008 |
| WO | WO 2008138969 A1 | 11/2008 |
| WO | WO 2009024025 A1 | 2/2009 |
| WO | 2010105435 A1 | 9/2010 |
| WO | WO 2010010535 A1 | 9/2010 |

OTHER PUBLICATIONS

"Universal Mobile Telecommunications System (UMTS); LTE; Access to the Evolved Packet Core (EPC) via non-3GPP Access Networks," Jan. 2009, ETSI TS 124 302, V8.0.0, ETSI, Sophia Antipolis Cedex, France.
"Technical Specification Group Services and System Aspects; General Packet Radio Service (GPRS) Enhancements for Evolved Universal Terrestrial Radio Access Network (E-UTRAN) Access)," 3GPP TS 23.401, Dec. 2008, V8.4.1, 3GPP, Valbonne, France.
"Technical Specification Group Services and System Aspects; Architecture Enhancements for Non-3GPP Accesses," 3GPP TS 23.402, Dec. 2008, V8.4.0, 3GPP, Valbonne, France.
"Technical Specification Group Services and System Aspects; Architecture Enhancements for Non-3GPP Accesses," 3GPP TS 23.402, Jun. 2009, V8.6.0, 3GPP, Valbonne, France.
"Technical Specification Group Core Network and Terminals; Access to the 3GPP Evolved Packet Core (EPC) via Non-3GPP Access Networks," 3GPP TS 24.302, Jun. 2009, V8.2.0, 3GPP, Valbonne, France.
"TD S2-083671; Frequency and Conditions for Triggering ND&S," 3GPP TSG SA WG2 Meeting #64, May 12-16, 2008, 3GPP, Valbonne, France.

"23.402 Change Request 0598; S2-091607—Roaming ANDSF Architecture," 3GPP TSG SA WG2 Meeting #71, Feb. 16-20, 2009, Revision 1, Current Version 8.4.1, 3GPP, Valbonne, France.
"23.402 Change Request 218; S2-083672—Frequency and Conditions for Access Network Discovery and Selection Procedure," 3GPP TSG SA2 Meeting #65, May 12-16, 2008, Revision 1, Current Version 8.1.1, 3GPP, Valbonne, France.
"S2-073219; Self-optimization of Assigned TA List from Reported List of Last Visited TAs," 3GPP TSG SA WG2 Meeting #59, Aug. 27-31, 2007, 3GPP, Valbonne, France.
"C1-072285; Access Network Discovery and Selection," 3GPP TSG CT WG1 Meeting #49, Oct. 8-12, 2007, 3GPP, Valbonne, France.
"C1-085322, CR on Limiting the Amount of Information Delivered to the UE by ANDSF," 3GPP TSG CT WG1, Meeting #56, Nov. 10-14, 2008, 3GPP, Valbonne, France.
Extended European Search Report in corresponding European Patent Application No. 09841718.1 (Dec. 16, 2011).
International Search Report in corresponding PCT Patent Application No. PCT/CN2009/070914 (Dec. 31, 2009).
1st Office Action in corresponding Chinese Patent Application No. 200980157907.6 (Dec. 5, 2012).
Written Opinion of the International Searching Authority in corresponding PCT Patent Application No. PCT/CN2009/070914 (Dec. 31, 2009).
"ANDSF generic procedure," Change Request, 3GPP TSG SA WG2 Meeting #64, Jeju Island, Korea, Document S2-082636, $3^{rd}$ Generation Partnership Project, Valbonne, France (Apr. 7-11, 2008).
"3GPP TS 23.401—$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)," Version 8.1.0, $3^{rd}$ Generation Partnership Project, Valbonne, France (Mar. 2008).
"3GPP TS 23.402—$3^{rd}$ Generation Partnership Project; Technical Specification Group Services and System Aspects; Architecture enhancements for non-3GPP accesses (Release 8)," Version 8.1.1, $3^{rd}$ Generation Partnership Project, Valbonne, France (Mar. 2008).
"3GPP TS 23.402—$3^{rd}$ Generation Partnership Project; Technical Specification Group Services and System Aspects; Architecture enhancements for non-3GPP accesses (Release 8)," Version 8.5.0, $3^{rd}$ Generation Partnership Project, Valbonne, France (Mar. 2009).

* cited by examiner

METHOD AND DEVICE FOR IMPROVING NETWORK DISCOVERY AND SELECTION

CROSS-REFERENCE TO RELATED APPLICATIONS

This application is a continuation of U.S. patent application Ser. No. 13/237,314, filed on Sep. 20, 2011, which is a continuation of International Patent Application No. PCT/CN2009/070914, filed on Mar. 20, 2009. The afore-mentioned patent applications are hereby incorporated by reference in their entireties.

FIELD OF THE TECHNOLOGY

The present invention relates to operation network selection technology, and more specifically relates to a method and network for improving Network Discovery and Selection.

BACKGROUND OF THE INVENTION

As described in FIG. 1, a 3GPP network or a Wifi network is combined by more than one Tracking Area (TA), and User Endpoint (UE), which register in an area including one TA or more than one TA (TA list). Usually, the UE receives and saves the TA or TAs sent from an area that the UE has registered. For example, the UE receives TA1 sent from area1 and saves it in its TA list when the UE is moving into area1. If later the UE moves into area2, it receives TA2 sent from area2 and adds TA2 into its TA list or replaces TA1 with TA2. When the UE moves into a new TA, a Tracking Area Update (TAU) procedure will be initiated.

In a conventional network, as described in FIG. 2, most of the areas are covered by the same radio technologies, e.g. a Long Term Evolution (LTE) network or other 3GPP network, and a default mobility policy can be applied. Only in some narrow area which is covered by different radio technologies, e.g. an LTE network and Wifi network, and a special mobility policy shall be applied. The mobility policies include:

1) Inter system mobility policy including a set of operator-defined rules and preferences that affect the inter-system mobility decisions taken by the UE; and 2) Access network discovery information including a list of access networks available in the vicinity of the UE for all the access technology types requested by the UE.

In the 6 TAs (TA1~TA6) of FIG. 2, different mobility policies are applied:

TA4: outside of the Wifi area, the LTE network is selected.

TA2, 3, 6: inside the Wifi area, the WiFi network is selected.

TA1: almost outside of the Wifi area, the LTE network is selected.

TA5: part of the TA is inside of the Wifi area, the network selection is based on more accurate location information.

When the UE is moving between TAs covered by different networks, the mobility policy will be updated. A special TA is the TA or a TA List at which the mobility policy will be updated if the UE is moving into the special TA. A non-special TA is the TA or TA List at which the mobility policy will not be updated if the UE is moving into the non-special TA. In FIG. 2, the TA or TA List which overlapped overlay by different radio technologies are the special TAs. So TA2, TA3, TA5 and TA6 are the special TAs when UE is located in TA1; TA1, TA4 and TA5 are the special TAs when UE is located in TA2.

In the 3GPP network, as described in FIG. 3, when the UE is moving between the TAs, the mobility management is implemented by an MME (Mobility Management Entity) via tracking the UE's location or the TA. MME functions include Tracking Area list management. All the tracking areas in a Tracking Area List to which a UE is registered are served by the same serving MME. Tracking Area list management comprises the functions to allocate and reallocate a Tracking Area Identity list to the UE. Moreover, the Network Discovery and Selection is implemented by an ANDSF (Access Network Discovery and Selection Function). The ANDSF contains data management and control functionality necessary to provide network discovery and selection assistance data as per operators' policy. The ANDSF is able to initiate data transfer to the UE, based on network triggers, and respond to requests from the UE. The ANDSF stores the network topology information and shall send available access network(s) and the mobility policies to the UE in response to the UE's request or based on the network triggers.

The 3GPP has described a mechanism of Network Discovery and Selection by sending the mobility policies from the ANDSF to the UE (see 3GPP TS 23.402 and TS 24.302). As described in 3GPP, there are two methods, push model and pull model, for ANDSF to send the policies to the UE.

In the push model the ANDSF may update the inter-system mobility policy based on network triggers. To provide the UE more useful and precise information, the ANDSF shall be able to limit the information provided to the UE, which is based on the UE's current location, UE capabilities, etc.

In the pull model of communication, the UE sends a query to the ANDSF to retrieve information about available access networks in its vicinity. The UE may include the following information in the request: 1) UE's current location; and 2) UE capabilities (e.g. a list of access networks that can be selected).

But the 3GPP did not describe detail mechanism which is necessary to Network Discovery and Selection:

In push model, how the ANDSF gets the network triggers to update the inter-system mobility policy, and how the ANDSF gets the UE's current location for limiting the information provided to UE are not described.

In pull model, when the UE sends query to the ANDSF is not described.

Therefore, in current 3GPP specification, there is no mechanism to update the mobility policies to the UE when the UE is moving to a new area.

SUMMARY OF THE INVENTION

Embodiments of the present invention provide method, a MMF and a MPF for improving Network Discovery and Selection suitable for a UE which is moving into a new TA.

According to one aspect of the present invention, a method for improving Network Discovery and Selection comprising: receiving, by a MMF, a TAU request including the new TA from the UE; allocating, by the MMF, a new TA List according to the new TA in the TAU request; sending, by the MMF, the new TA List to the UE; sending, by the MMF, a TA information to a Mobility Policy Function, MPF, for updating mobility policy of the UE if the new TA is a special TA covered by different networks.

According to another aspect of the present invention, a method for improving Network Discovery and Selection comprising: receiving, by a MPF, a TA information for updating mobility policy of the UE; updating the mobility policy of the UE if the new TA is a special TA covered by different networks.

According to another aspect of the present invention, a MMF for improving Network Discovery and Selection comprising: a storing unit which is configured to store the network topology information; a allocating unit which is configured to generate a new TA list according to the network topology information in the storing unit and the current location of the UE in the TAU request; a TA information unit which is configured to send a TA information including the new TA list to update the mobility policy.

According to another aspect of the present invention, a MPF for improving Network Discovery and Selection comprising: a receiving unit which is configured to receive a TA information to update the mobility to the UE; a storing unit which is configured to store mobility policies; a updating unit which is configured to get the updated policy from the storing unit and send it to the UE if the new TA is a special TA covered by different networks.

According to another aspect of the present invention, a system comprising for improving Network Discovery and Selection suitable for a UE which is moving into a new TA, comprising a MMF and a MPF being capable of performing the method of claims 1 to 11.

DETAILED DESCRIPTION OF THE INVENTION

In order to make the object, the technical scheme and the advantages of the present invention clearer and more obvious, the present invention will be described in detail hereinafter with reference to embodiments and accompanying drawings.

One of the embodiments of this invention is to update the mobility policies to the UE when UE is moving to a new area.

Figure 1:
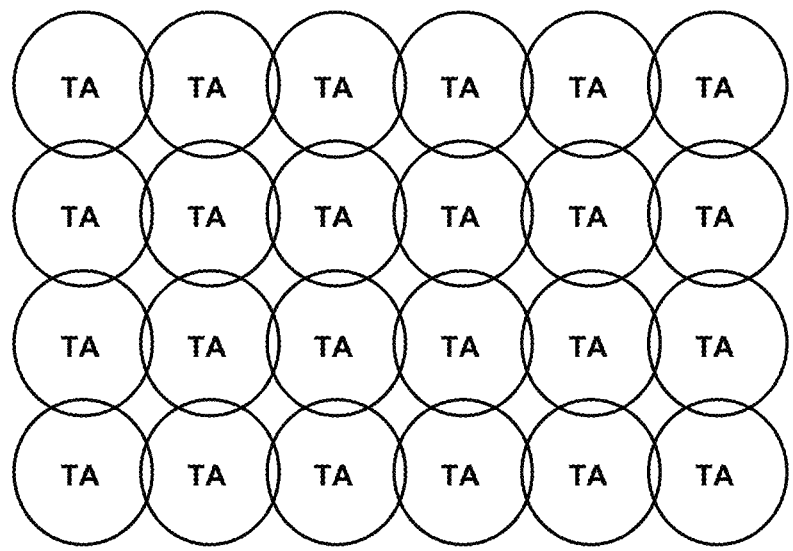
FIG. 1 is a 3GPP network or Wifi network combined by more than one Tracking Area.
Figure 2:
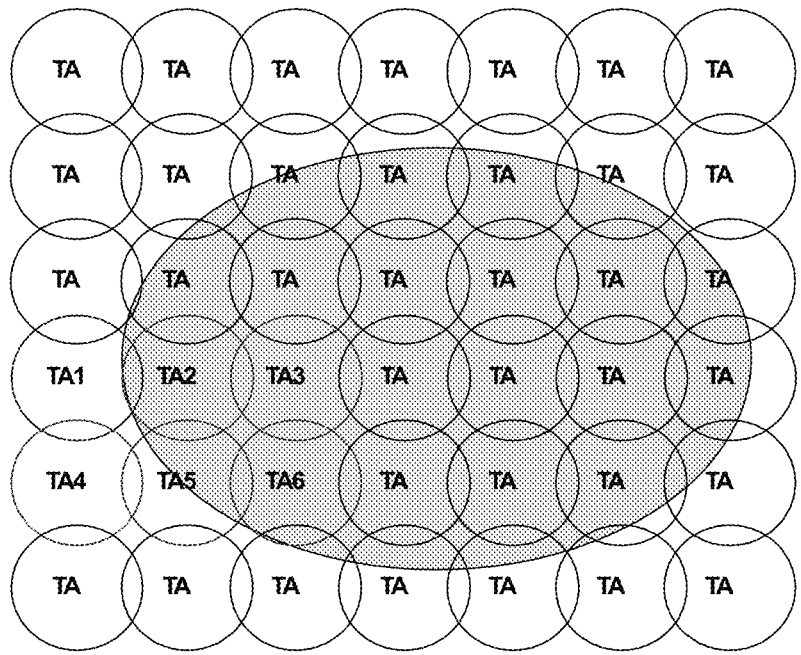
FIG. 2 is an existing network covered by different technologies.
Figure 3:
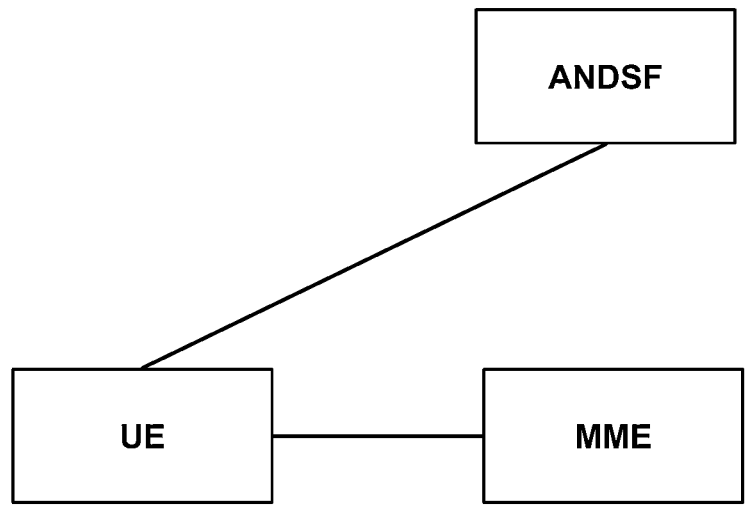
FIG. 3 is a basic architecture applied for the existed network.
Figure 4:
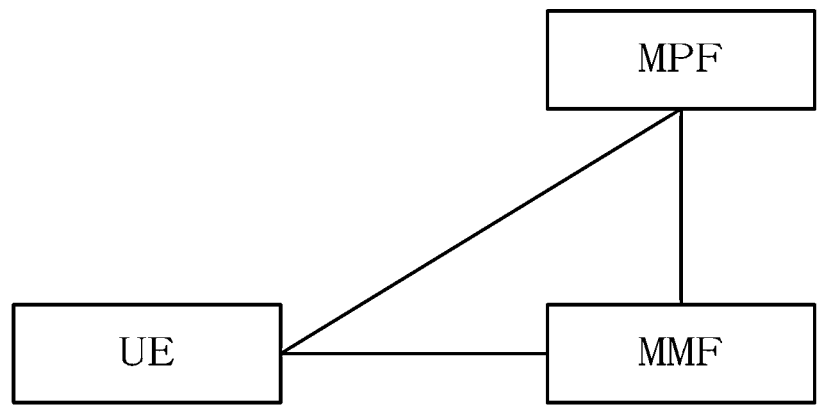
FIG. 4 is a basic architecture applied for present invention.

According to one embodiment, the basic architecture applied for the invention is described in FIG. 4 including MMF (Mobility Management Function, e.g. MME in 3GPP) and MPF (Mobility Policy Function, e.g. ANDSF in 3GPP). Mobility management performed by MMP includes allocating the UE' TA List and storing the UE's status and TA. The MPF stores the network topology information and shall send available access network(s) and operator's policy to the UE in response to the UE's request or based on the network triggers. Both MMF and MPF are logical elements and can be located at a same physical network element.

The mobility policies updating may be based on the subscriber profile of the UE or any other information which network has. The updating may be happened when service is active or no service is active.

When UE is moving into a special TA, a TA covered by different networks, MMF or UE informs MPF with TA information and then MPF sends the updated mobility policy to the UE based on the TA information.

In push model, during the TAU procedure, MMF informs a TA information of the UE to MPF when UE is moving into a special TA, and then MPF sends the updated mobility policy to the UE. The TA information may be TA or TA List, In case of TA, the TA information is sent from UE to MMF, MMF informs MPF only when the TA UE moving into is one of the special TAs.

In case of TA list, the TA information is allocated by MMF, MMF informs MPF only when the TA list allocated by MPF include one of the special TAs.

In pull model, during the TAU procedure, UE informs the MPF with a TA information of itself to request the updated mobility policy from MPF. The TA information can be TA or TA List. In case of TA, the TA information is detected by UE; in case of TA List, the TA information is allocated by MMF and sent to UE.

In both push model and pull model, the TAU procedure can be initiated by UE when UE detects a change to a new TA and in the list of TAs, or UE detects that the time for a periodic TAU is reached.

The special TAs identified is not included in the TA List with any other TAs when MMF allocated the new TA List to the UE. It optimizes the TA list allocated by MMF.

Figure 5:
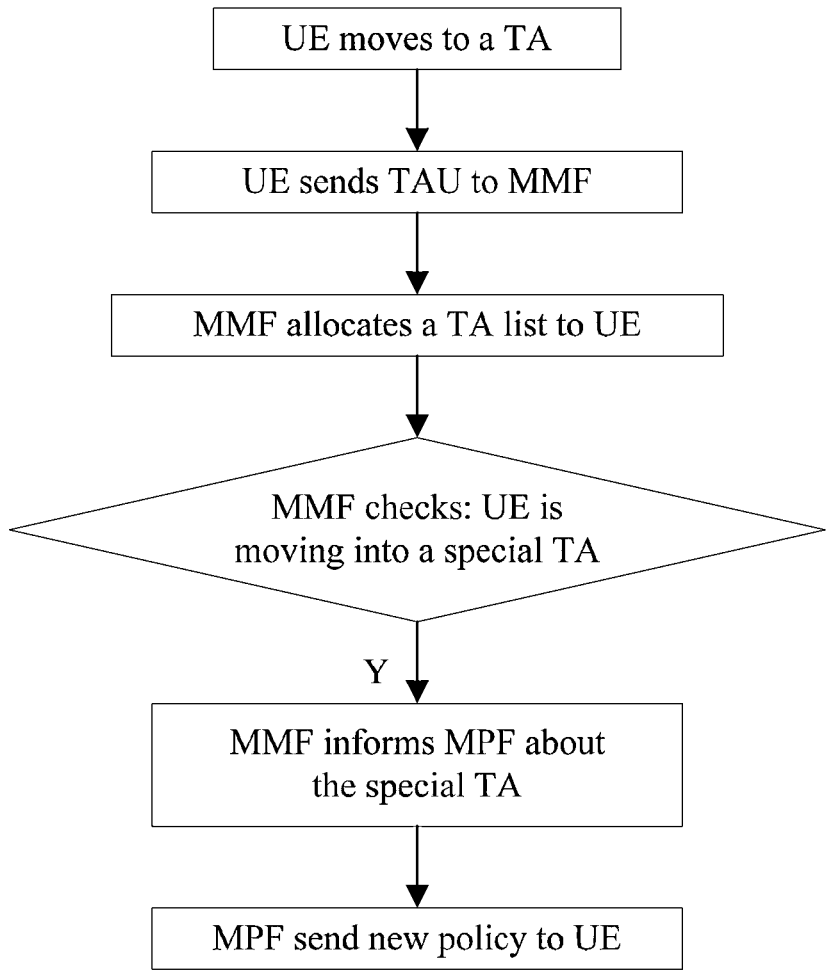
FIG. 5 is a brief flow chart illustrating the process of improving Network Discovery and Selection in Push model according to an embodiment of the present invention.
Figure 6:
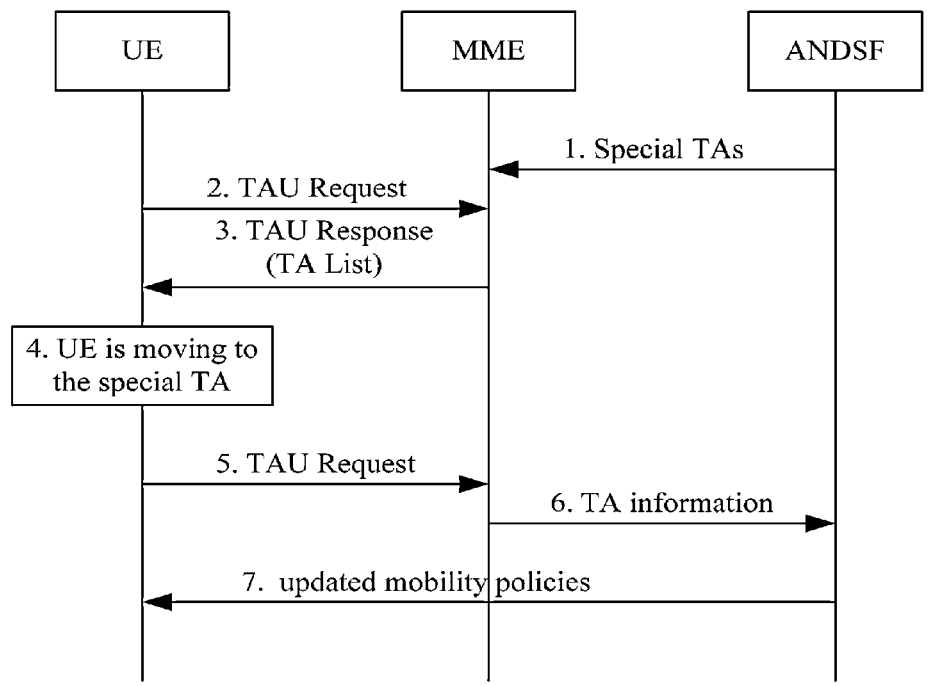
FIG. 6 is a flow chart illustrating the process of improving Network Discovery and Selection in Push model according to an embodiment of the present invention.

One embodiment of Push model according to present invention is shown in FIG. 5 and FIG. 6. In this embodiment when a UE is moving into a new TA and send a TAU request to MMF, MMF allocates a TA list to the UE and check whether the TA which the UE is moving into is a special TA or a non-special TA close to a special TA. If the TA is a special TA, the MMF sends a TA information including the special TA to the MPF. The detailed process of mobility policy updating comprises the following steps:

Step 101: MMF gets the special TAs.

The special TAs is originated based on the subscription profile of UE (e.g. authentication information including the information indicating whether a radio access can be visited by UE), the network topology and any other information for access network selection. The special TAs may be sent from MPF (e.g. ANDSF), HSS, AAA server, Network Management, or other equipment. Moreover, the special TAs may be configured in the MMF. In this embodiment, the special TAs is sent from ANDSF.

The special TAs has two kinds of granularities, network granularity and user granularity.

In case of network granularity, the special TAs is based on the network information, network topology and access network status. The special TAs is available for all the UEs in a same network, including the UE roaming to the area, because the MPF (e.g. ANDSF) can send the special TAs to the MMF and MME can also send the special TAs to UE. The MPF can send the special TAs to the MMF when bootstrap or access network status changes. The special TA may be updated when the network topology changes. For example, when a new WiFi network starts or stops working and the ANDSF detects the WiFi network status changed, a new special TAs can be sent to the MME.

In case of user granularity, in additional to the network information, the special TAs is based on the user information, e.g. User Profile, User preference, terminal capability. The special TAs is only available for the certain UE which has the user information. When UE attachment or TAU with MMF changed, the MPF can send the special TAs of the UE to the MMF based on the request from MME. For example, when MMF request user profile from HSS, MMF request special TAs from MPF also. The special TAs may be updated when the subscription profile of UE changes. For example, if the Wifi network is not permitted to be visited by UE, the area covered by the Wifi network are not special TAs and can be updated. The special TAs may also be updated when any other information for access network selection (e.g. user preference) changes.

In roaming scenario, the MPF in visited network have the network information and the ANDSF in home network have the user information, the 2 ANDSF can work together to send the special TAs to the MMF.

Step 102: UE sends a TAU request to the MMF when UE is moving between the non-special TAs.

The TAU procedure can be initiated by UE when UE detects a change of TA and the new TA is out of the TA List, or UE detects that the time for a periodic TAU is reached. The TAU request includes UE's current location, the TA which UE is moving into.

Step 103: MMF allocates a new TA list and sends the TA list to UE.

The new TA list may be allocated according to network topology and includes UE's current location, the TA the UE is moving into.

Moreover, the MMF checks whether the UE is moving into a special TA. For example, the MMF can maintain one special TA list table, which includes a list of the special TAs. If the TA which UE is moving into is included in the special TA list table, it means the UE is moving into a special TA. When allocating a new TA List, the MMF may exclude the special TA from the new TA List. So after allocating the new TA list, MMF checks it to determine if the UE is moving into a special TA according to the new TA List and the special TA list table. If any of the TA in the new TA list is included in the special TA list table or any of the TA in the special TA list table is included in the new TA List, it means that the UE is moving into a special TA; if none of the TA in the new TA List is included in the special TA list table or none of the TA in the special TA list table is included in the new TA list, it means the UE is not moving into a special TA. In this step none of the special TAs identified by MPF in step 101 is included in the TA list because the UE is moving between non-special TAs.

Step 104: UE is moving into a special TA;

Since none of the special TAs identified by the MPF in step 101 is included in the new TA list allocated by MMF in step 103, it is necessary that the UE send a TAU request to MMF when UE is moving to a special TA. The TAU request includes the UE's current location, the TA which the UE is moving into.

Step 106: MMF allocates a new TA List to the UE and informs the MPF with a TA information including the special TA.

The MMF checks whether the UE is moving into a special TA after receiving the TAU request from the UE. Only when UE is moving to a special TA, MMF informs the MPF. So MPF gets the network triggers and the UE's current location. For example, MMF can maintain one special TA list table which includes a list of the special TAs and check if the UE is moving into a special TA by the way in the step 103. If the TA UE is moving into is included in the special TA list table, it means the UE is moving into a special TA.

It is also possible that MMF does not connect to the MPF directly, and transmits the current TA to MPF via other network elements. e.g. MMF sends the current TA to SGW, SGW forwards it to PDN GW, PDN GW forwards it to PCRF, and PCRF forwards it to the ANDSF.

Step 107: MPF sends the updated inter-system mobility policy to UE

It may trigger the Handover to another access network.

Figure 7:
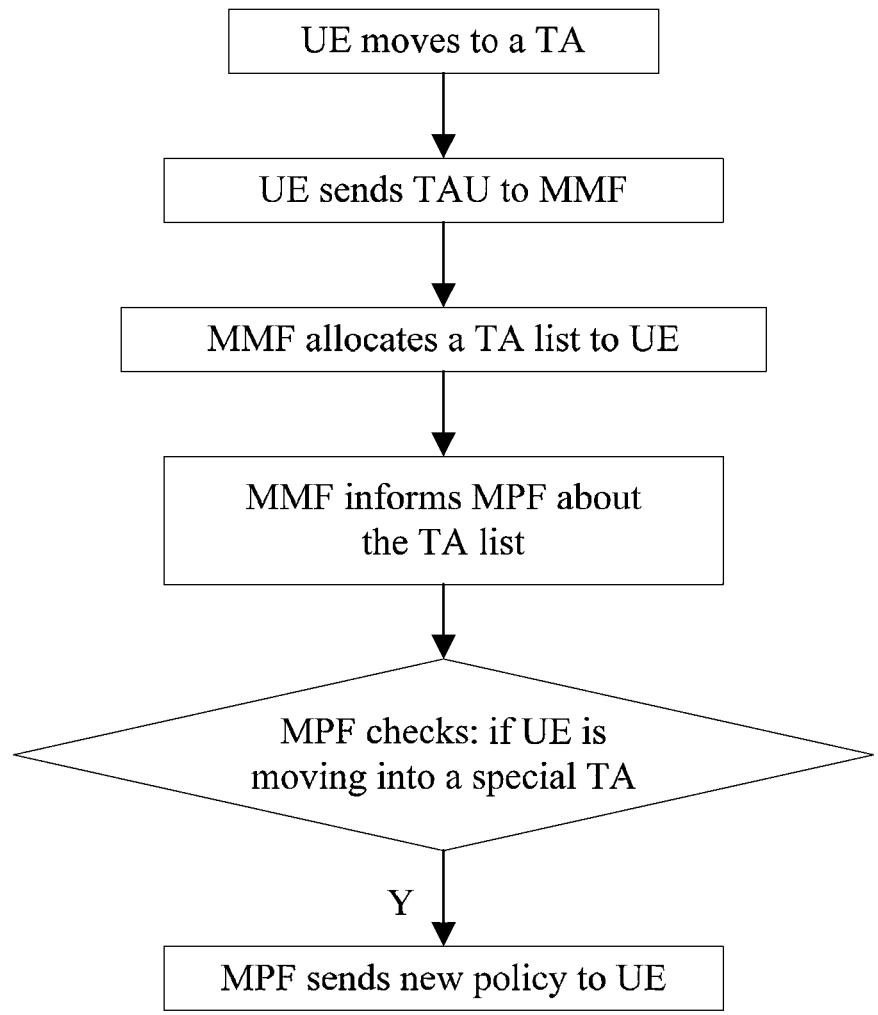
FIG. 7 is a brief flow chart illustrating the process of improving Network Discovery and Selection in Push model according to another embodiment of the present invention.
Figure 8:
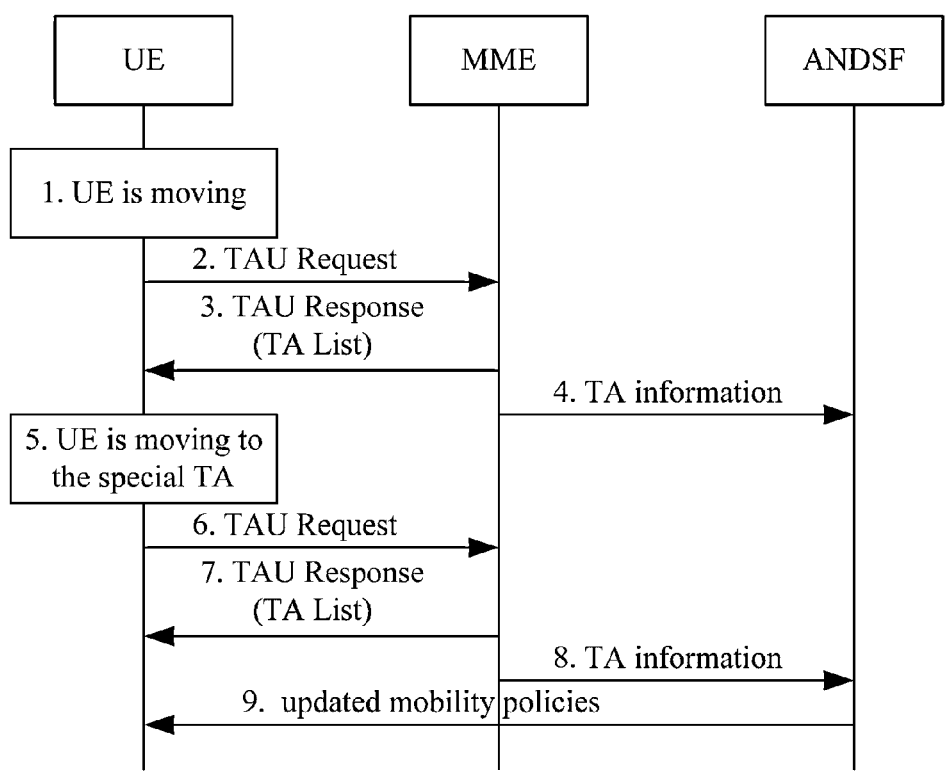
FIG. 8 is a flow chart illustrating the process of improving Network Discovery and Selection in Push model according to another embodiment of the present invention.

Another embodiment of Push model where the TA information is a TA list according to present invention is shown in FIG. 7 and FIG. 8. In this embodiment the special TAs is not sent to the MME and MME has no information of special TA. So when the UE is moving into a new TA and send a TAU request to MME, MME allocates a TA list to UE and inform the MPF with a TA information including the TA list. Then the MPF checks whether the TA list includes a special TA. It means that the UE is moving into a special TA or a non-special TA close to a special TA. If UE is moving into a special TA or a non-special TA close to a special TA, the ANDSF sends updated policy to the UE. The detailed process of this embodiment comprises the following steps:

Step 201: UE is moving between the non-special TAs.

Step 202: UE sends a TAU request to the MME.

The TAU procedure can be initiated by UE when UE detects a change to a new TA and in the list of TAs, or UE detects that the time for a periodic TAU is reached.

Step 203: MME allocates a new TA List and sends it to the UE.

The new TA List may be allocated according to network topology and includes the UE's current location, the TA which the UE is moving into.

Step 204: MMF informs the MPF with a TA information including the new TA list allocated to the UE.

After receiving the TA information including the TA list from MMF, the MPF checks whether the mobility policy shall be updated. If any TA included in the TA List is a special TA covered by different access technologies, the mobility policy shall be updated, otherwise, the mobility policy shall not be updated. In this step, as the UE is moving between non-special TAs, the TA list allocated by the MMF does not include any special TA which covered by different access technologies; therefore, MPF does not update the mobility policy to UE.

Since the MPF can store the network topology information and/or special TA list table, it is capable of identifying whether the TA the UE is moving into is a special TA. For example, MPF may check by the way described in the step 103.

It is also possible that MMF does not connect to the MPF directly, and transmits the current TA to MPF via other network elements. e.g. MMF sends the current TA to SGW, SGW forwards it to PDN GW, PDN GW forwards it to PCRF, and PCRF forwards it to the MPF. So the MPF can get the network trigger and current location of the UE directly or indirectly from the MMF.

Step 205: UE is moving to a special TA or a non-special TA close to a special TA.

Step 206: UE sends a TAU request to the MME.

The TAU procedure can be initiated by UE when UE detects a change to a new TA and the new TA is out of the TA List or UE detects that the time for a periodic TAU is reached.

Step 207: MMF allocates a new TA List and sends it to the UE.

The new TA List may be allocated according to network topology and includes the UE's current location, the TA which the UE is moving into. If the UE is moving to a special TA, the special TA is included in the TA List. Since in this embodiment the MMF hasn't the special TA list table, if the UE is moving to a non-special TA close to a special TA, it is possible that the special TA may also be included in the TA List.

Step 208: MMF informs MPF with a TA information including the TA List allocated to the UE.

Responding to the TA information, the MPF checks whether the TA List includes any special TA. In this step, the special TA is included in the TA List. Since the MPF can store the network topology information and/or special TA list table, it is capable of identifying whether the TA the UE is moving into is a special TA. For example, MPF may check by the way in the step 103.

Step 209: MPF sends the updated inter-system mobility policy to UE if the TA list includes a special TA.

The updated mobility policy may include the policy like "handover when moving into the special TA".

Figure 9:
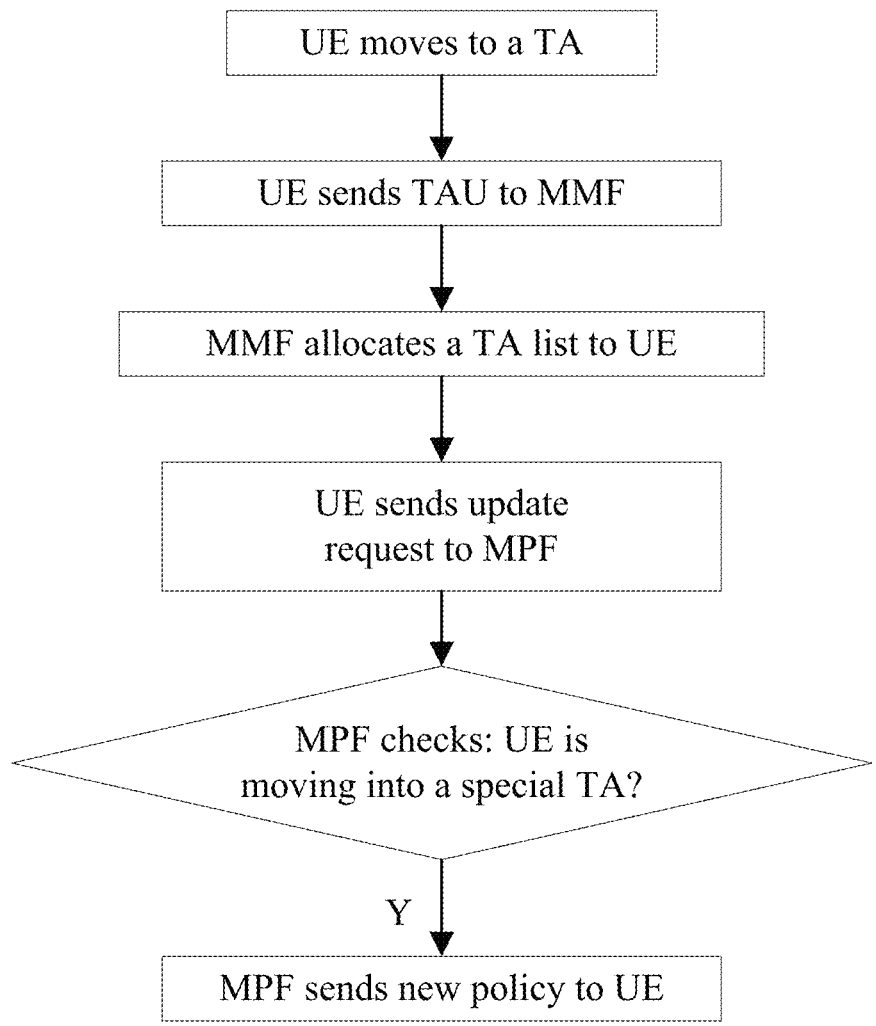
FIG. 9 is a brief flow chart illustrating the process of improving Network Discovery and Selection in Pull model according to another embodiment of the present invention.
Figure 10:
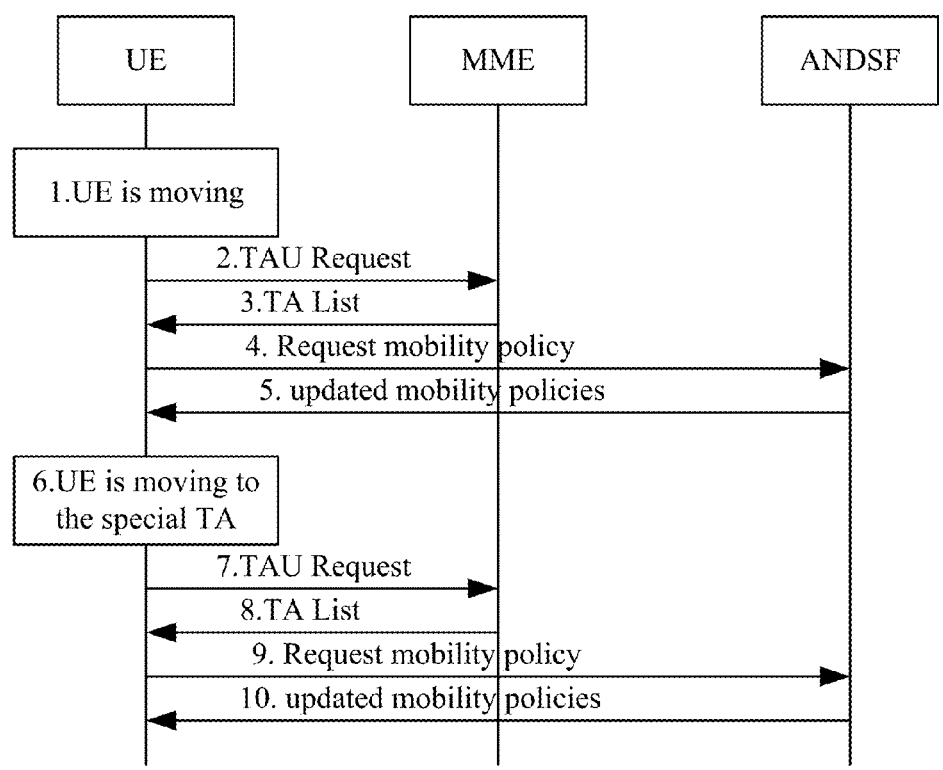
FIG. 10 is a flow chart illustrating the process of improving Network Discovery and Selection in Pull model according to another embodiment of the present invention.

Another embodiment of Pull model according to present invention is shown in FIG. 9 and FIG. 10. In this embodiment, when the UE is moving into a new TA and send a TAU request to MMF, MMF allocates a TA list to UE. Then the UE sends a policy updating request to the MPF. After receiving the request from the UE, the MPF checks whether the UE is moving into a special TA. If UE is moving into a special TA, the MPF sends the updated policy to the UE. The detailed process of this embodiment comprises the following steps:

Step 301: UE is moving between the non-special TAs

Step 302: UE sends a TAU request to the MMF.

The TAU procedure may be initiated by UE when UE detects a change to a new TA and the new TA is out of the TA List, or UE detects that the time for a periodic TAU is reached. The TAU request includes UE's current location, the TA which UE is moving into.

Step 303: MMF allocates a new TA List and sends the TA List to UE.

The new TA List may be allocated according to network topology and includes UE's current location, the TA which the UE is moving into.

Step 304: UE sends a mobility policy request including a TA information about the new TA list to MPF.

UE requests mobility policy from MPF via a mobility policy request and the new TA List received from the MMF is included in the request.

Step 305: MPF sends the inter-system mobility policy to UE based on UE's request.

After receiving the request from the UE, the MPF checks whether the UE is moving into a special TA. Since the MPF can store the network topology information and/or special TA list table, it is capable of identifying whether the TA the UE is moving into is a special TA. For example, MPF may check by the way in the step 103.

In this step, the mobility policy is not updated one since the UE is moving between the non-special TA, Step 306: UE is moving to a special TA or a non-special TA close to a special TA.

Step 307: UE sends a TAU request to the MMF.

Step 308: MMF allocates a new TA List and sends it to UE.

The new TA List may be allocated according to network topology and includes the UE's current location, the TA which the UE is moving into.

Step 309: UE sends a mobility policy request including a TA information about the new TA list to MPF.

UE requests mobility policy from MPF via a mobility policy request and the new TA List received from the MMF is included in the request.

Step 310: MPF sends the updated inter-system mobility policy to UE based on UE's request.

After receiving the request from the UE, the MPF checks whether the UE is moving into a special TA. Since the MPF can store the network topology information and/or special TA list table, it is capable of identifying whether the TA the UE is moving into is a special TA. For example, MPF may check by the way in the step 103.

In this step as a special TA is included in the new TA List from UE, the mobility policy is updated. The updated mobility policy may include the policy like "handover when moving into the special TA".

Figure 11:
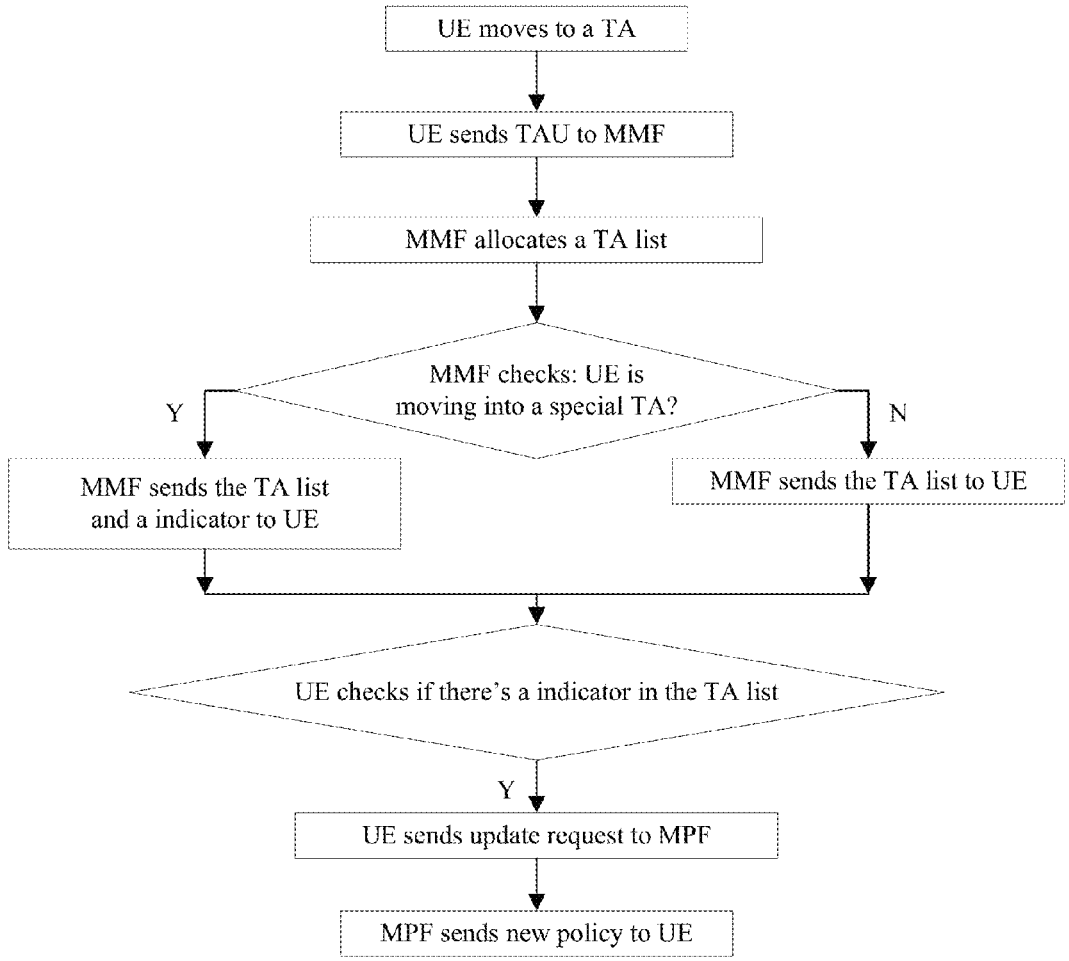
FIG. 11 is a brief flow chart illustrating the process of improving Network Discovery and Selection in Pull model according to another embodiment of the present invention.
Figure 12:
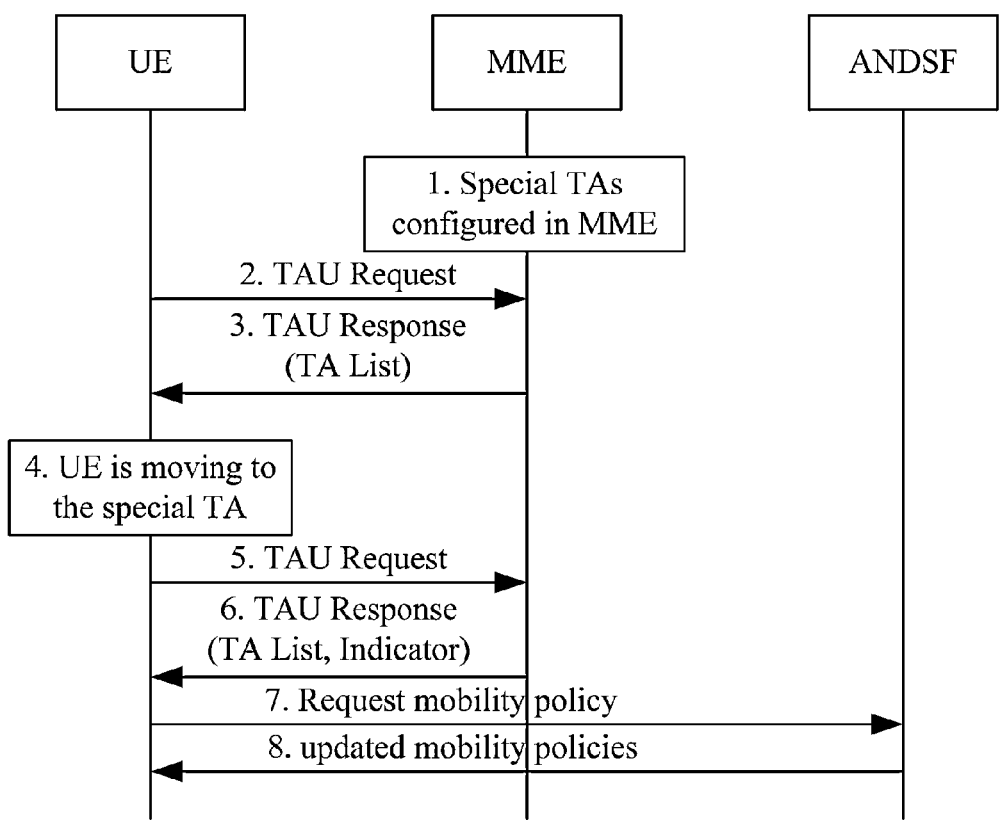
FIG. 12 is a flow chart illustrating the process of improving Network Discovery and Selection in Pull model according to another embodiment of the present invention.

Another embodiment of Pull model according to present invention is shown in FIG. 11 and FIG. 12. In this embodiment, when the UE is moving into a new TA and send a TAU request to MMF, MMF allocates a new TA list to UE and check if the UE is moving into a special TA. If the UE is moving into a special TA, the MMF sends a TA information including the new TA list and a indicator to the UE. Then the UE sends a policy updating request to MPF if there is an indicator in the TA information and the MPF sends updated policy to the UE. The detailed process of this embodiment comprises the following steps:

Step 401: MMF gets the special TAs.

The special TAs can be sent from MPF, HSS, AAA server, Network Management, or any other equipment and have the same character to that of the special TAs in step 101. Moreover, the special TAs may be configured in the MMF. In this example, the special TAs are configured in the MMF.

Step 402: UE sends a TAU request to the MMF when UE is moving between the non-special TAs.

The TAU procedure may be initiated by UE when UE detects a change to a new TA and the new TA is out of the TA List or when UE detects that the time for a periodic TAU is reached. The TAU request includes UE's current location, the TA which UE is moving into.

Step 403: MMF allocates a new TA List and sends it to the UE.

The new TA List may be allocated according to network topology and includes the UE's current location, the TA which the UE is moving into.

Upon receiving the TAU request from the UE, the MMF checks whether the UE is moving into a special TA by the way described in the step 103.

If the UE is moving into a special TA, the MMF shall send the UE a TA information including the new TA list and a mobility policy request indicator, otherwise only the new TA list is included in the TA information. In this step, no mobility policy request indicator is existed and only the new TA list is sent to the UE because the UE is moving between the non-special TAs.

Another variety is that a special TA may also be included in the new TA List if the UE is moving to a non-special TA close to the special TA.

Upon receiving the TA information the UE checks whether there is a mobility policy request indicator existed in the TA information received from MMF. If there is a mobility policy request indicator, the UE requests mobility policy from MPF, otherwise, the UE does not request mobility policy from MPF. In this step, no mobility policy request indicator is existed.

Step 404: UE is moving to a special TA or a non-special TA close to the special TA.

Step 405: UE sends TAU Request to MMF when UE is moving to the special TA or the non-special TA close to the special TA.

The TAU procedure may be initiated by UE when UE detects a change to a new TA and in the list of TAs, or UE detects that the time for a periodic TAU is reached. The TAU request includes UE's current location, the TA which UE is moving into.

Step 406: MMF allocates a new TA List and sends the TA List to UE.

The new TA List may be allocated according to network topology and includes the UE's current location, the TA which the UE is moving into.

Upon receiving the TAU request from the UE, the MMF checks whether the UE is moving into a special TA by the way described in the step 103.

If the UE is moving into a special TA, the MMF shall send the UE a TA information including the new TA list and a mobility policy request indicator, otherwise only the new TA list is included in the TA information. In this step, a mobility policy request indicator and the new TA list are sent to the UE because the UE is moving into a special TA.

When allocates a new TA list, the MMF may exclude the special TA from the new TA list. So another variety is that a special TA may also be included in the TA List if the UE is moving to a non-special TA close to the special TA.

Step 407: UE requests mobility policy from MPF.

Upon receiving the TA information from the MMF, the UE checks whether there is a mobility policy request indicator existed in the TA information received from MMF. If there is a mobility policy request indicator, the UE sends a mobility policy updating request to update mobility policy from MPF, otherwise, the UE does not request mobility policy from MPF. In this step, a mobility policy request indicator is existed and the UE requests mobility policy from MPF. The TA information received from MMF is included in the request sent to the MPF. Another variety is that only the new TA list or the special TA is included in the request sent to the MPF.

Step 408: MPF sends the updated inter-system mobility policy to UE based on UE's request.

As a special TA is included in the TA List from UE, which may be checked by the MPF by the way described in the step 103, the mobility policy is updated. If it is not the TA list but the special TA is included in the request from the UE, the mobility policy is also updated. The updated mobility policy may trigger the handover to another network.

In this embodiment, if one of the special TAs is included in the TA information MMF allocates to the UE, MMF sets a mobility policy request indicator and sends it to the UE with the TA information, then UE requests the updated mobility policy from MPF only when the mobility policy request indicator existed. It avoids the unnecessary policy requests because if there's no special TA in the TA information, the update of mobility policy is not necessary.

Another embodiment of Pull model is based on the previous embodiment. In this embodiment the UE has stored policies, e.g. according to the profile of the user, and the UE can update the policies by itself. These policies have been set in the UE by the operator. For example the operator can define: "use operator's hotspot whenever is available". The detailed process of this embodiment comprises the following steps:

Step 501: The MMF gets the special TAs.

The special TAs can be sent from MPF, HSS, AAA server, Network Management, or any other equipment and have the same character to that of the special TAs in step 101. Moreover, the special TAs may be configured in the MMF. In this example, the special TAs are configured in the MMF.

Step 502: UE sends a TAU request to the MMF when UE is moving between the non-special TAs.

The TAU procedure may be initiated by UE when UE detects a change to a new TA and the new TA is out of the TA List, or UE detects that the time for a periodic TAU is reached. The TAU request includes UE's current location, the TA which UE is moving into.

Step 503: The MMF allocates a new TA List and it to the UE.

The new TA List may be allocated according to network topology and includes the UE's current location, the TA which the UE is moving into. When allocates a new TA list, the MME may exclude the special from the new TA list.

Upon receiving the TAU request from the UE, the MMF checks whether the UE is moving into a special TA by the way described in the step 103.

If the UE is moving into a special TA, the MMF shall send the UE a TA information including the new TA list and a mobility policy request indicator, otherwise only TA list is included in the TA information. In this step, no mobility policy request indicator is existed and only the new TA list is sent to the UE because the UE is moving between the non-special TAs.

Another variety is that a special TA may also be included in the TA List if the UE is moving into a non-special TA close to the special TA.

Upon receiving the TA information the UE checks whether there is a mobility policy request indicator existed in the TA information received from MMF. In this step, no mobility policy request indicator is existed.

Step 504: UE is moving to a special TA or a non-special TA close to the special TA.

Step 505: UE sends TAU Request to MMF when UE is moving to the special TA or the non-special TA close to the special TA.

The TAU procedure may be initiated by UE when UE detects a change to a new TA and in the list of TAs, or UE detects that the time for a periodic TAU is reached. The TAU request includes UE's current location, the TA which UE is moving into.

Step 506: MMF allocates a new TA List and sends the TA List to UE.

The new TA List may be allocated according to network topology and includes the UE's current location, the TA which the UE is moving into.

Upon receiving the TAU request from the UE, the MMF checks whether the UE is moving into a special TA. The MMF can maintain a special TA list table, which includes a list of the special TAs. When allocates a new TA List, MMF checks every TAs inside the new TA List. If any of the TA in TA list is included in the special TA list table, it means the special TAs is included in the TA List and thus the UE is moving into a special TA; if none of the TA list is included in the special TA list table, it means the special TAs is not included in the TA List and thus the UE is not moving into a special TA.

If the UE is moving into a special TA, the MMF shall send the UE a TA information including the new TA list and a mobility policy request indicator, otherwise only the new TA list is included in the TA information. In this step, a mobility policy request indicator and the new TA list are sent to the UE because the UE is moving into a special TA.

Another variety is that a special TA may also be included in the TA List if the UE is moving to a non-special TA close to the special TA.

Step 507: UE automatically apply stored policies.

In this embodiment, since UE has stored policies, it is not necessary for the UE to require updated policy from the MPF which means switch on 2nd air interface, perform vertical Handover, and inform MMF about HO to hotspot.

In all the examples above, the TAU request from UE to MMF can be replaced by any other message which UE report its current TA to the MME, the TAU response from MME to UE can replaced my any other message which MME sends the updated TA List to the UE.

In all of the examples, as the state of UE may be turned from CONNECTED state to IDLE state soon after TAU before getting the policy from the MPF, MMF or UE may keep the UE's CONNECTED state before policies updated or extend the timer which UE's state changes to IDLE, to avoid unnecessary service request or paging. If UE's state changes to IDLE, in current 3GPP mechanism, to send the updated mobility policies to the UE, network has to send paging message, to find the UE, or the UE has to send the service request.

Figure 13:
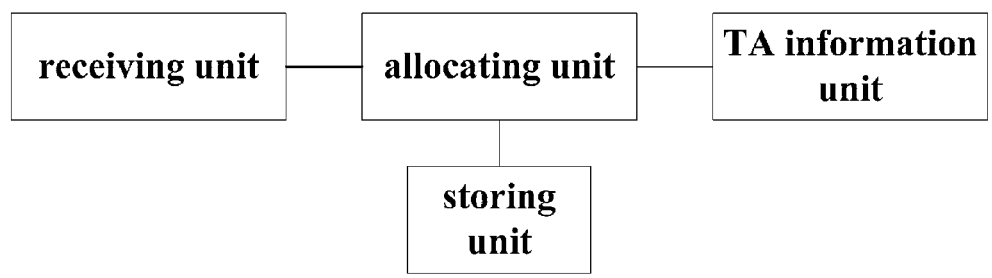
FIG. 13 is the structure of a Mobility Management Function for improving Network Discovery and Selection according to another embodiment of the present invention.

Based on the method embodiments above, one embodiment of MMF is shown in FIG. 13. The MMF comprises a receiving unit, an allocating unit, a TA information unit and a storing unit. The receiving unit is configured to receive TAU request including the current location of the UE from the UE. The allocating unit is configured to generate a new TA list according to the network topology stored in the storing unit and the current location of the UE in the TAU request. The TA information unit is configured to send a TA information including the new TA list to the MPF to update the inter-system mobility policy.

Figure 14:
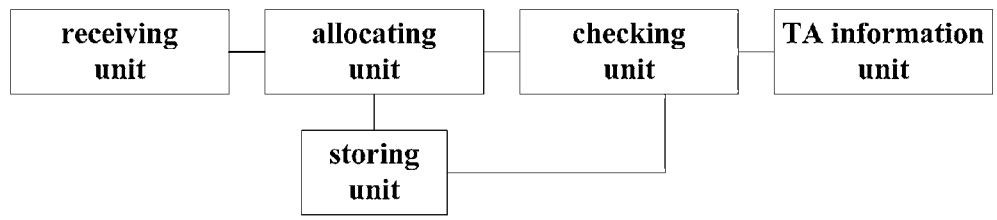
FIG. 14 is the structure of a Mobility Management Function for improving Network Discovery and Selection according to another embodiment of the present invention.

Another embodiment of MMF based on the method embodiments above is shown in FIG. 14. The MMF comprises a receiving unit, an allocating unit, a checking unit, a TA information unit and a storing unit. The receiving unit is configured to receive TAU request including the current location of the UE from the UE. The allocating unit is configured to generate a new TA list according to the network topology stored in the storing unit and the current location of the UE in the TAU request. The checking unit is configured to determine if the TA which the UE is moving into is a special TA according to a special TA list table stored in the storing unit and the new TA list by the way described in the step 103. The TA information unit is configured to send TA information to update the inter-system mobility policy. The TA information may be sent to the MPF or the UE. In case of MPF, if the checking unit determines that the TA which the UE is moving into is a special TA, the TA information includes the special TA. In case of the UE, the TA information includes the new TA list and a mobility policy request indicator if the checking unit determines that the TA which the UE is moving into is a special TA; if the checking unit determines that the TA which the UE is moving into is not a special TA, the TA information includes the new TA list.

Figure 15:
FIG. 15 is the structure of a Mobility Policy Function for improving Network Discovery and Selection according to another embodiment of the present invention.

Based on the method embodiments above, one embodiment of MPF is shown in FIG. 15. The MPF comprises a receiving unit, a updating unit and a storing unit. The receiving unit is configured to receive the TA information to update the inter-system mobility policy. The updating unit is configured to get the updated policy from the storing unit and send it to the UE. In this embodiment the TA information to update the inter-system mobility policy is the special TA which the UE is moving into.

Figure 16:
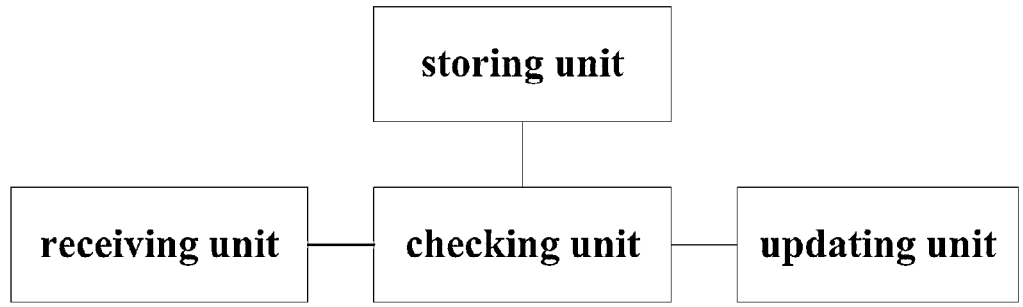
FIG. 16 is the structure of a Mobility Policy Function for improving Network Discovery and Selection according to another embodiment of the present invention.

Another embodiment of MPF based on the method embodiments above is shown in FIG. 16. The MPF comprises a receiving unit, a checking unit, a updating unit and a storing unit. The receiving unit is configured to receive the TA information to update the inter-system mobility policy. In this embodiment the TA information to update the inter-system mobility policy may be the new TA list allocated by the MPF and be sent from the MMF or from the UE via a mobility policy updating request. The checking unit is configured to determine if the UE is moving into a special TA according to a special TA list table stored in the storing unit and the new TA list by the way described in the step 103. The updating unit is configured to get the updated policy from the storing unit and send it to the UE if the UE is moving into a special TA.

Although the invention has been described through several exemplary embodiments, the invention is not limited to such embodiments. It is apparent that those of ordinary skill in the art can make various modifications and variations to the invention without departing from the spirit and scope of the invention. The invention is intended to cover the modifications and variations provided that they fall within the scope of protection defined by the following claims or their equivalents.

What is claimed is:

1. A method for improving Network Discovery and Selection suitable for a User Endpoint (UE), which is moving into a new Tracking Area (TA), comprising:
   receiving, by a Mobility Policy Function (MPF), a new TA List from the UE, wherein the new TA list is a list of a plurality of TAs allocated to the UE by a Mobility Management Function (MMF); and
   updating the mobility policy of the UE if the new TA is a special TA covered by different networks wherein the process of updating the mobility policy of the UE if the new TA is the special TA covered by the different networks comprises:
   checking if there is a common TA in a special TA list table stored in the MPF and the new TA List;
   sending a updated mobility policy to the UE, if there is the common TA in the special TA list table and the new TA List.

2. A Mobility Management Function (MMF) for improving Network Discovery and Selection suitable for a User Endpoint (UE), which is moving into a new Tracking Area (TA), comprising:
   a receiving unit, configured to receive a Tracking Area Update (TAU) request including a current location of the UE;
   a storing unit, configured to store network topology information;
   an allocating unit, configured to generate a new TA list according to the network topology information in the storing unit and the current location of the UE in the TAU request, wherein the new TA list is is a list of a plurality of TAs allocated to the UE by the MMF;
   a TA information unit, configured to send TA information including the new TA list to update a mobility policy;
   wherein the MMF further comprises:

a checking unit, configured to determine if the new TA is a special TA according to the new TA List and a special TA list table.

3. A Mobility Policy Function (MPF) for improving Network Discovery and Selection suitable for a User Endpoint (UE), which is moving into a new Tracking Area (TA), comprising:
- a receiving unit, configured to receive TA information to update mobility to the UE;
- a storing unit, configured to store mobility policies;
- a updating unit, configured to get an updated policy from the storing unit and send the updated policy to the UE if the new TA is a special TA covered by different networks;

wherein the MPF further comprises:
- a checking unit, configured to determine if the new TA is a special TA according to the new TA List and a special TA list table.

4. A method for improving Network Discovery and Selection suitable for a User Endpoint (UE), which is moving into a new Tracking Area (TA), comprising:
- receiving, by a Mobility Management Function (MMF), a Tracking Area Update (TAU) request, including the new TA from the UE;
- allocating, by the MMF, a new TA List according to the new TA in the TAU request, wherein the new TA List is is a list of a plurality of TAs allocated to the UE by the MMF;
- sending, by the MMF, the new TA List to the UE;
- sending, by the MMF, via the UE, the new TA List to a Mobility Policy Function (MPF), for updating mobility policy of the UE if the new TA is a special TA covered by different networks;

wherein the process of sending the TA information to the MPF comprises:
sending the TA information to the MPF via the UE, determining if the new TA is the special TA, and sending the special TA to the MPF if the new TA is the special TA.

5. The method according to claim 4, wherein the process of sending the TA information to the MPF further comprises:
- sending the new TA list and a mobility policy request indicator to the MPF if the new TA is the special TA; and
- sending the new TA list to the MPF if the new TA is not the special TA.

* * * * *